United States Patent
Browne et al.

(10) Patent No.: US 8,190,331 B2
(45) Date of Patent: May 29, 2012

(54) SYSTEMS FOR DETECTING ANIMATE OBJECTS IN A VEHICLE COMPARTMENT

(75) Inventors: Alan L. Browne, Grosse Pointe, MI (US); Nancy L. Johnson, Northville, MI (US); James Y. Khoury, Macomb, MI (US); Artie J Martin, Fraser, MI (US); Pablo D. Zavattieri, Ann Arbor, MI (US); William Barvosa-Carter, Ventura, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 351 days.

(21) Appl. No.: 11/933,682

(22) Filed: Nov. 1, 2007

(65) Prior Publication Data
US 2008/0103660 A1 May 1, 2008

Related U.S. Application Data

(60) Provisional application No. 60/863,882, filed on Nov. 1, 2006.

(51) Int. Cl.
| B60R 22/00 | (2006.01) |
| E05F 15/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl. ........... 701/45; 701/46; 701/49; 340/425.5; 340/438; 340/449; 180/272; 180/273; 280/735

(58) Field of Classification Search .............. 701/45–46; 340/425.5
See application file for complete search history.

(56) References Cited

U.S. PATENT DOCUMENTS

| | | | | |
|---|---|---|---|---|
| 5,424,711 A | * | 6/1995 | Muller et al. | 340/426.26 |
| 5,821,633 A | * | 10/1998 | Burke et al. | 307/10.1 |
| 5,948,031 A | | 9/1999 | Jinno et al. | |
| 5,957,016 A | * | 9/1999 | Segalman et al. | 82/1.11 |
| 6,088,642 A | * | 7/2000 | Finkelstein et al. | 701/49 |
| 6,480,103 B1 | * | 11/2002 | McCarthy et al. | 340/425.5 |
| 6,621,411 B2 | * | 9/2003 | McCarthy et al. | 340/425.5 |
| 6,816,077 B1 | * | 11/2004 | Shieh et al. | 340/602 |
| 6,819,249 B1 | | 11/2004 | Papp | |
| 6,820,896 B1 | | 11/2004 | Norton | |
| 6,825,765 B2 | * | 11/2004 | Stanley et al. | 340/561 |
| 6,922,622 B2 | | 7/2005 | Dulin et al. | |
| 7,362,225 B2 | * | 4/2008 | Rittmueller et al. | 340/562 |
| 7,467,809 B2 | * | 12/2008 | Breed et al. | 280/735 |
| 2002/0074786 A1 | | 6/2002 | Hamperl et al. | |
| 2002/0163426 A1 | * | 11/2002 | Moskowitz | 340/426 |
| 2003/0196485 A1 | * | 10/2003 | Schoor et al. | 73/159 |
| 2005/0109935 A1 | * | 5/2005 | Manlove et al. | 250/300 |
| 2005/0125117 A1 | * | 6/2005 | Breed | 701/29 |
| 2005/0206095 A1 | * | 9/2005 | Keefe et al. | 277/628 |
| 2005/0230546 A1 | * | 10/2005 | McKnight et al. | 244/124 |
| 2006/0028333 A1 | * | 2/2006 | Tyndall | 340/447 |
| 2006/0038643 A1 | * | 2/2006 | Xu et al. | 335/78 |

* cited by examiner

*Primary Examiner* — Jack W Keith
*Assistant Examiner* — Rami Khatib
(74) *Attorney, Agent, or Firm* — Quinn Law Group, PLLC

(57) ABSTRACT

Systems for detecting animate objects in a vehicle compartment include active materials based sensors for detecting the presence of an animate object in the compartment. The systems produce a response if the sensors detect the presence of an animate object in the compartment and at least one other predetermined condition exists.

19 Claims, 11 Drawing Sheets

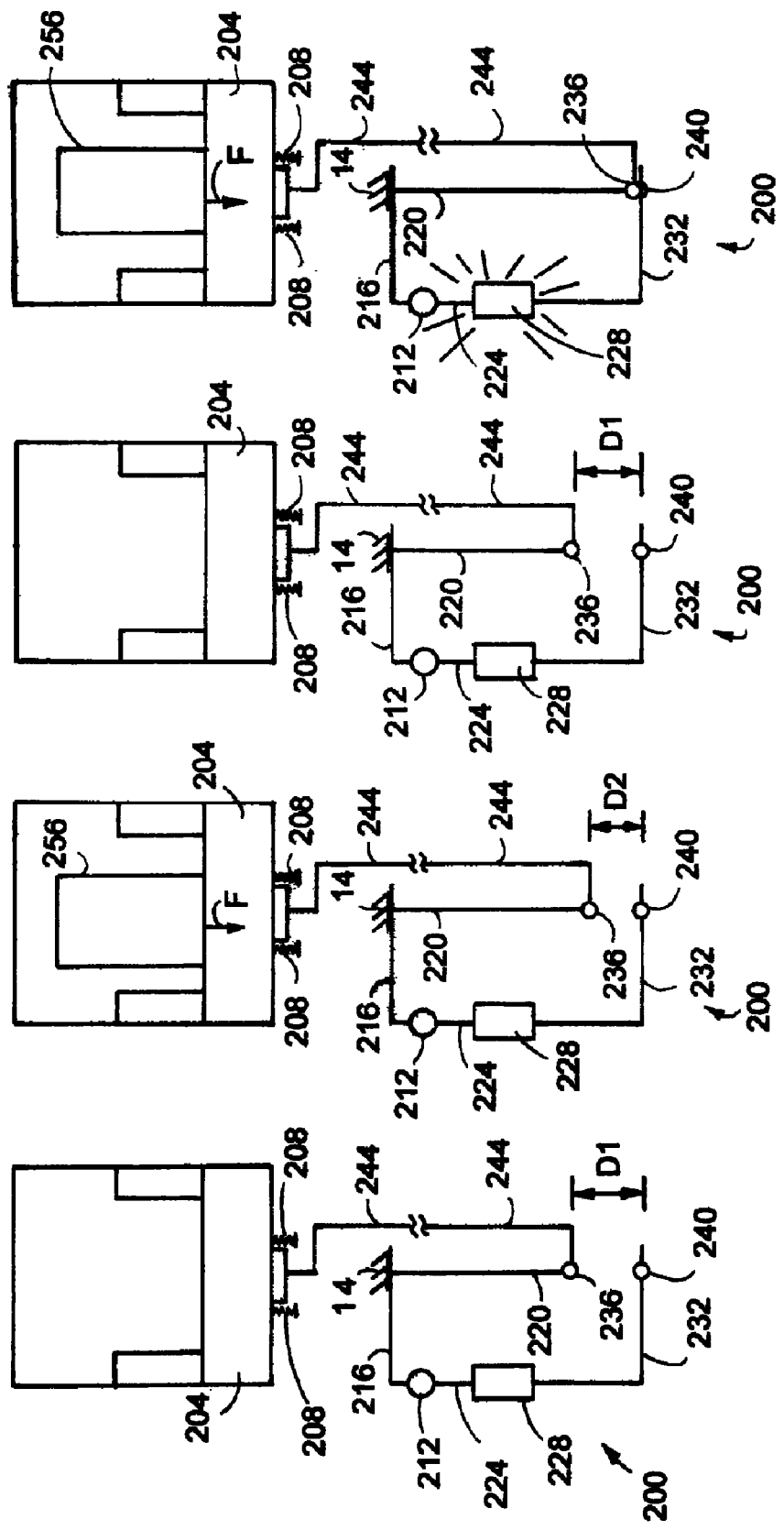

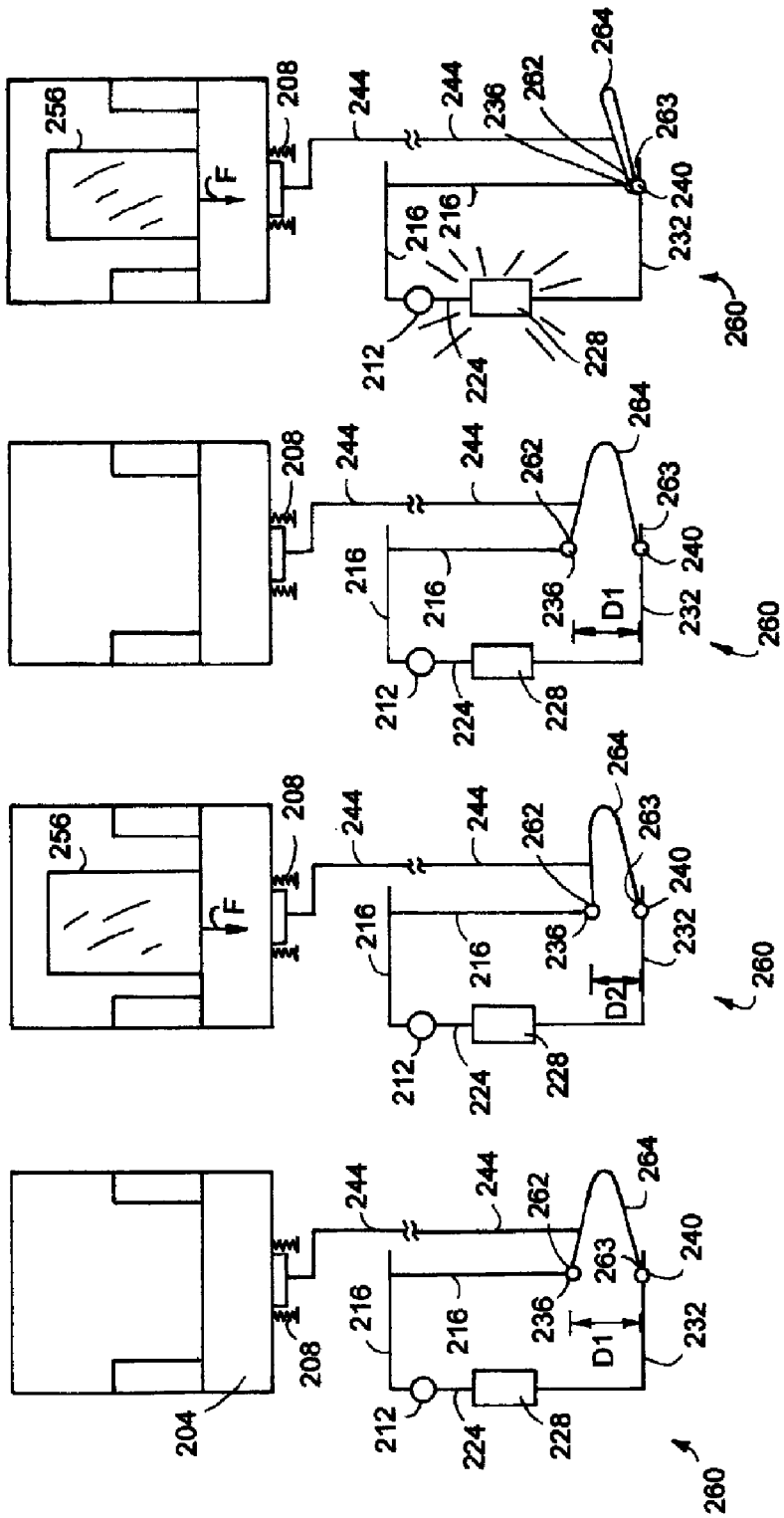

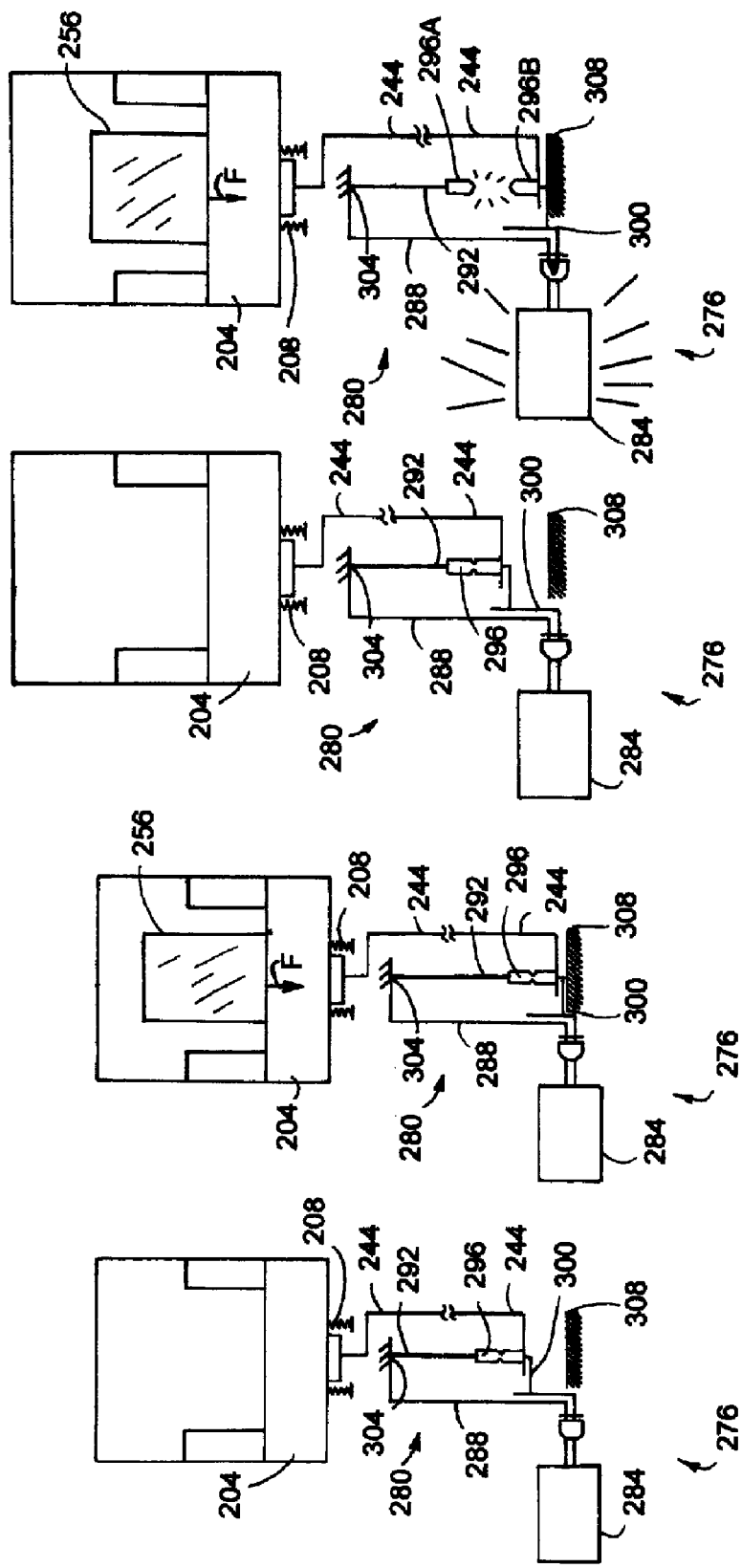

SYSTEMS FOR DETECTING ANIMATE OBJECTS IN A VEHICLE COMPARTMENT

CROSS REFERENCE TO RELATED APPLICATION

This application claims the benefit of U.S. Provisional Patent Application No. 60/863,882, filed Nov. 1, 2006, and which is hereby incorporated by reference in its entirety.

TECHNICAL FIELD

This invention relates to active material based sensors configured to detect animate objects inside a vehicle compartment.

BACKGROUND OF THE INVENTION

Vehicle bodies typically define an enclosed passenger compartment. The passenger compartment has seats for transporting passengers therein, and is typically enclosed to protect passengers from the elements. The passenger compartment is accessible through doors that are lockable to prevent unauthorized entry into the passenger compartment such as when the vehicle is unattended while parked.

Vehicle bodies also typically include an enclosed storage area. The storage area may be open to, or part of, the passenger compartment, as found in minivans and sport utility vehicles. The storage area may also be a separate compartment that is inaccessible from the passenger compartment, such as a trunk in a sedan or coupe. The storage area in vehicles such as minivans and sport utility vehicles is typically accessible from the outside of the vehicle through a rear closure such as a liftgate. Trunks are typically accessible through a closure such as a decklid. The storage compartment closures are lockable to prevent unauthorized access to items in the storage compartment.

SUMMARY OF THE INVENTION

In one embodiment, a vehicle body defines a compartment. At least one sensor is sufficiently positioned with respect to the compartment such that movement of an animate object inside the compartment causes deformation or displacement of the sensor. The sensor generates an electrical charge or current in response to the deformation or displacement. The sensor is operatively connected to a controller such that the charge or current causes a motion detection signal to be transmitted to the controller. The sensor may be operatively connected to the controller via a radio frequency transmitter and receiver, electrically conductive materials, etc. The controller is programmed to transmit a command signal when at least one predetermined condition exists, including the sensor transmitting a motion detection signal.

In other embodiments, a vehicle body defines a passenger compartment having a passenger seat therein. The seat is operatively connected to an active material, such as a shape memory alloy or a shape memory polymer, to transmit the weight of an object on the seat to the active material. The shape memory material is characterized by a first modulus below a predetermined temperature and a second modulus above the predetermined temperature.

The active material is operatively connected to an electrical circuit and causes the circuit to be opened or closed depending on the temperature of the active material and the amount of weight transmitted by the seat to the active material. An alert system is operatively connected to the electrical circuit and is configured to be activated or deactivated depending on whether the circuit is open or closed.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 7a is a schematic front view of a system for detecting the presence of an object on a vehicle seat when the temperature is below a predetermined temperature;

FIG. 7b is a schematic front view of the system of FIG. 7a above the predetermined temperature and with an object on the vehicle seat;

FIG. 7c is a schematic front view of the system of FIGS. 7a-7b below the predetermined temperature;

FIG. 7d is a schematic front view of the system of FIGS. 7a-7c below the predetermined temperature and with an object on the vehicle seat;

FIG. 8a is a schematic front view of a system for detecting the presence of an object on a vehicle seat when the temperature is above a predetermined temperature;

FIG. 8b is a schematic front view of the system of FIG. 8a below the predetermined temperature and with an object on the vehicle seat;

FIG. 8c is a schematic front view of the system of FIGS. 8a-8b above the predetermined temperature;

FIG. 8d is a schematic front view of the system of FIGS. 8a-8c above the predetermined temperature and with an object on the vehicle seat;

FIG. 9a is a schematic front view of another system for detecting the presence of an object on a vehicle seat when the temperature is above a predetermined temperature;

FIG. 9b is a schematic front view of the system of FIG. 9a below the predetermined temperature and with an object on the vehicle seat;

FIG. 9c is a schematic front view of the system of FIGS. 9a-9b above the predetermined temperature;

FIG. 9d is a schematic front view of the system of FIGS. 9a-9c above the predetermined temperature and with an object on the vehicle seat.

DESCRIPTION OF THE PREFERRED EMBODIMENTS

Figure 1:
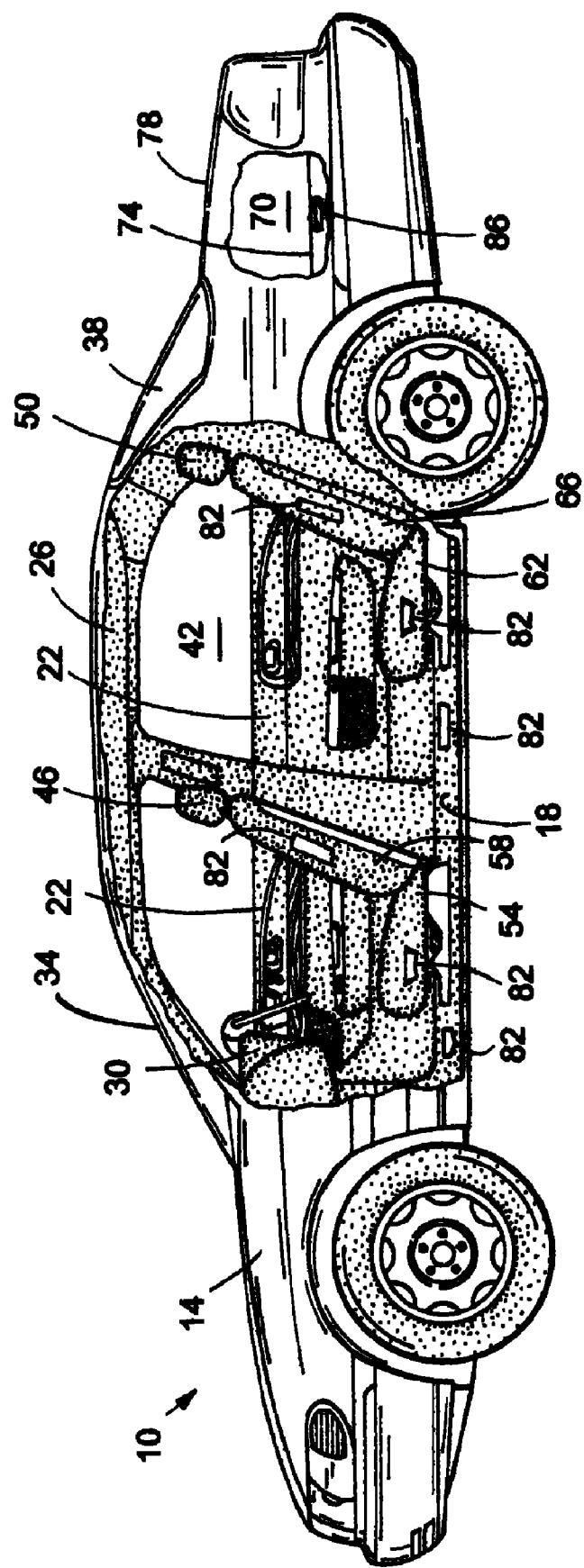
FIG. 1 is a schematic, partial cutaway view of a vehicle.

Referring to FIG. 1, a vehicle 10 including a vehicle body 14 is schematically depicted. The vehicle body 14 includes a floor 18, doors 22, a roof 26, an instrument panel 30, a windshield 34, and a rear window 38, all of which cooperate to define a passenger compartment 42. The vehicle 10 includes front seats 46 and rear seats 50 in the passenger compartment. The front seats 46 include a lower seat portion 54 and a seatback portion 58. Similarly, the rear seats 50 include a lower seat portion 62 and a seatback portion 66.

The vehicle body 14 also defines a storage compartment rearward of the passenger compartment 42. More specifically, in the embodiment depicted, the storage compartment is a trunk 70. A trunk floor 74 defines the lower extent of the trunk 70, and the trunk is selectively accessible by a trunk lid 78, which is also sometimes referred to as a rear decklid.

The vehicle 10 includes passenger compartment sensors 82. The sensors 82 are positioned in locations in which movement of an object inside the passenger compartment is likely to result in a force being transmitted to at least one of the sensors 82. In the embodiment depicted, sensors are positioned in the lower seat portions 54, 62 and the seatback portions 58, 66 of the passenger seats 46, 50. Sensors 82 are also depicted on the floor 18 under the carpet or other flexible floor covering (not shown). Other exemplary locations for sensors 82 include the doors 22, such as on or under the interior trim panels of the doors 22; on the instrument panel, such as under a flexible exterior surface thereof; at the connection of the seats 46, 50 to the passenger compartment floor 18; etc.

The vehicle 10 also includes storage compartment sensors 86 that are positioned in locations in which movement of an object inside the storage compartment, i.e., trunk 70, is likely to result in a force being transmitted to at least one of the sensors 86. An exemplary location for sensors 86 is on the trunk floor 74 beneath the trunk floor carpet or other flexible floor covering (not shown). In general, the sensors 82, 86 are preferably located with respect to a surface in the passenger compartment or storage compartment with which an animate object inside the passenger compartment or storage compartment might reasonably be expected to come into contact; force exerted by the animate object is transmitted from the surface to the sensors to cause deformation or displacement of the sensors. For example, the surface may be flexible so that force is readily transmittable to a sensor beneath the flexible surface; the surface may be substantially rigid but be selectively moveable to transmit force to a sensor and deform or displace the sensor; etc.

The passenger compartment sensors 82 and the storage compartment sensors 86 are configured such that they create an electrical charge or current when deformed or displaced by a force applied thereto. In an exemplary embodiment, the sensors 82, 86 comprise an active material that generates an electrical charge or current when deformed, such as piezoelectric material. As understood by those skilled in the art, piezoelectric materials produce an electrical charge when deformed as a result of mechanical stress. In the event that piezoelectric material is employed, it is preferably in the form of piezopolymers, for example as thin and flexible uni-morph, bi-morph, patches, woven fibers, etc. Other materials that may be employed to generate a charge or current in response to deformation or displacement include piezoeramics as fibers, unimorphs, bimorphs, patches, etc.; electroactive polymers (EAP), for example, as thin and flexible patches; membranes/enclosed cavities containing fluids with magnetic particles surrounded by electrical conducting medium—such as highly conductive rubber—the motion/flow of which fluid would result in a current/voltage being generated; magnetorestrictive composites wherein flexure of the magnetorestrictive material generates a changing magnetic field and induces a current in a coil; ionic polymer metal composites; multiferroic materials (hybrid piezo/magnetostrictive); ferroelectret foams; resonant magnet/coil combinations; etc.

Figure 2:
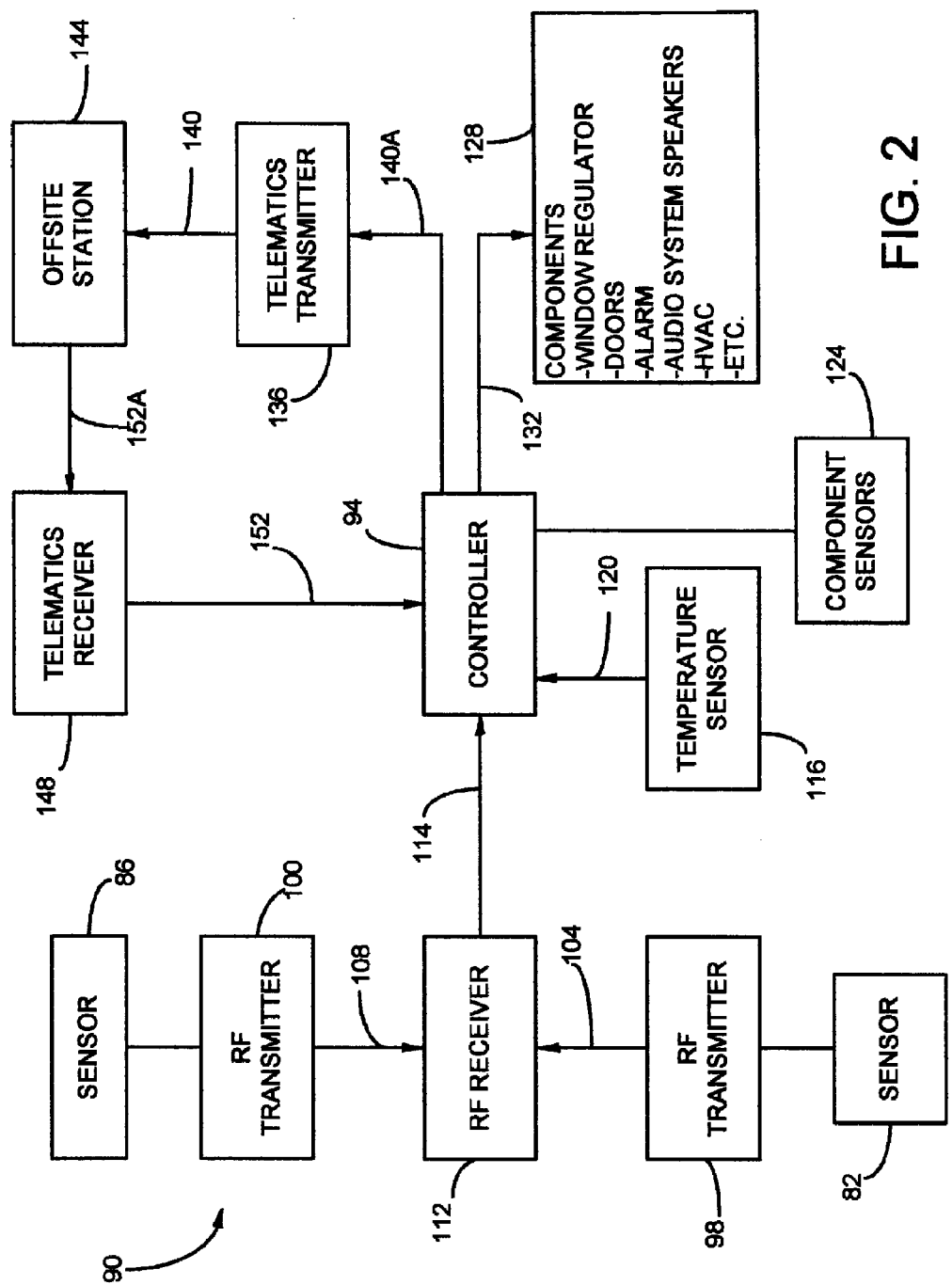
FIG. 2 is a schematic depiction of a motion detection system of the vehicle of FIG. 1.

Referring to FIG. 2, wherein like reference numbers refer to like components from FIG. 1, a motion detection system 90 is schematically depicted. The motion detection system 90 includes a controller 94. Only one of sensors 82 is schematically depicted in FIG. 2; it should be noted that the sensor 82 depicted in FIG. 2 is representative of all sensors depicted at 82 in FIG. 1. Each of the sensors 82, 86 is operatively connected to the controller 94 to communicate whether the sensors 82, 86 are deformed or displaced as a result of an animate object inside the passenger compartment or the trunk of the vehicle body.

More specifically, in the embodiment of FIG. 2, each of the sensors 82, 86 is operatively connected to the controller 94 via a respective wireless, radio frequency transmitter 98, 100. Sensor 82 is in electrical communication with transmitter 98, such as by conductive wires, so that the current generated by the sensor 82 as a result of deformation or displacement is used by the transmitter 98 to generate a wireless, radio frequency signal 104. Similarly, sensor 86 is in electrical communication with transmitter 100, such as by conductive wires, so that current generated by the sensor 86 as a result of deformation or displacement is used by the transmitter 100 to generate a wireless, radio frequency signal 108. The motion detection system 90 includes a radio frequency receiver 112 that is sufficiently positioned with respect to the transmitters 98, 100 to receive signals 104, 108. The receiver 112 is also operatively connected to the controller 94, such as via conductive wires, to communicate to the controller 94 whether a wireless signal 104, 108 is being transmitted by one of the transmitters 98, 100. In the embodiment depicted, the receiver 112 communicates that a wireless signal 104, 108 has been received by transmitting a motion detection signal 114 to the controller 94. Thus, the sensors 82, 86 are operatively connected to the controller 94 for communication via transmitters 98, 100 and receiver 112. It will be appreciated that a pre-processor could be employed to operate on the signal from the sensor or sensors 82, 86 prior to input to the controller 94 to determine whether the signal has certain characteristics. For example, operations on the signal could include filtering, power spectral density analysis, amplification, etc.

The RF receiver 112 and controller are depicted onboard the vehicle, i.e., mounted with respect to the vehicle body (shown at 14 in FIG. 1). However, the receiver 112 and controller 94 may be offboard the vehicle within the scope of the claimed invention. The RF receiver 112 may also be integrally assembled as part of the controller 94 within the scope of the claimed invention.

The system 90 further includes a temperature sensor 116 that is configured to monitor the temperature inside the passenger compartment (shown at 42 in FIG. 1). The sensor 116 is operatively connected to the controller 94, such as via an electrically conductive medium, a wireless RF connection, etc., and configured to communicate the temperature of the passenger compartment to the controller 94. It should be noted that, within the scope of the claimed invention, communication by a sensor may include both the presence and the absence of an electrical or other signal when the absence of a signal is indicative of a state of a vehicle component. For example, the temperature sensor 116 may be configured to transmit a signal 120 to the controller 94 only when the temperature of the passenger compartment is above a first predetermined temperature or below a second predetermined temperature, and not when the temperature of the passenger compartment is between the first and second predetermined temperatures. The sensor 116 communicates the temperature of the passenger compartment to the controller 94 when it does not transmit signal 120 because the absence of signal 120 indicates that the temperature of the passenger compartment is between the first and second temperatures. Alternatively, and within the scope of the claimed invention, the sensor 116 may continuously transmit signal 120, which varies in amplitude, frequency, etc., to indicate the temperature of the passenger compartment.

Other sensors or detectors 124 monitor the status of other vehicle components and conditions, and communicate the status of the other vehicle components and conditions to the controller 94. For example, a sensor 124 may communicate to the controller 94 whether the engine (not shown) is running, whether the ignition switch is in the on or off position, whether a door is open or closed, whether the transmission selector is in its park position, whether the vehicle is stationary etc.

The controller 94 is operatively connected to one or more vehicle components 128, such as via conductive wires, to selectively transmit command signals 132 to the components 128. The components 128 are responsive to the command signals 132 from the controller 94 to cause a physical change to the vehicle, such as movement of a component, activation of a component, etc. The controller 94 is also operatively connected to a telematics transmitter 136 to selectively cause the telematics transmitter 136 to transmit a wireless, radio frequency signal 140 to an offboard station 144. The signal 140 may be transmitted directly from the transmitter 136 to the station 144, or may be transmitted indirectly, such as by a satellite relay (not shown), cellular telephone system (not shown), etc. A telematics receiver 148 is configured to receive signals 152A from the offboard station 144 and is operatively connected to the controller 94 to transmit signals 152 thereto. Signals 152 and 152A convey the same information; signal 152A is a radio frequency signal and signal 152 is an electrical signal.

Figure 3:
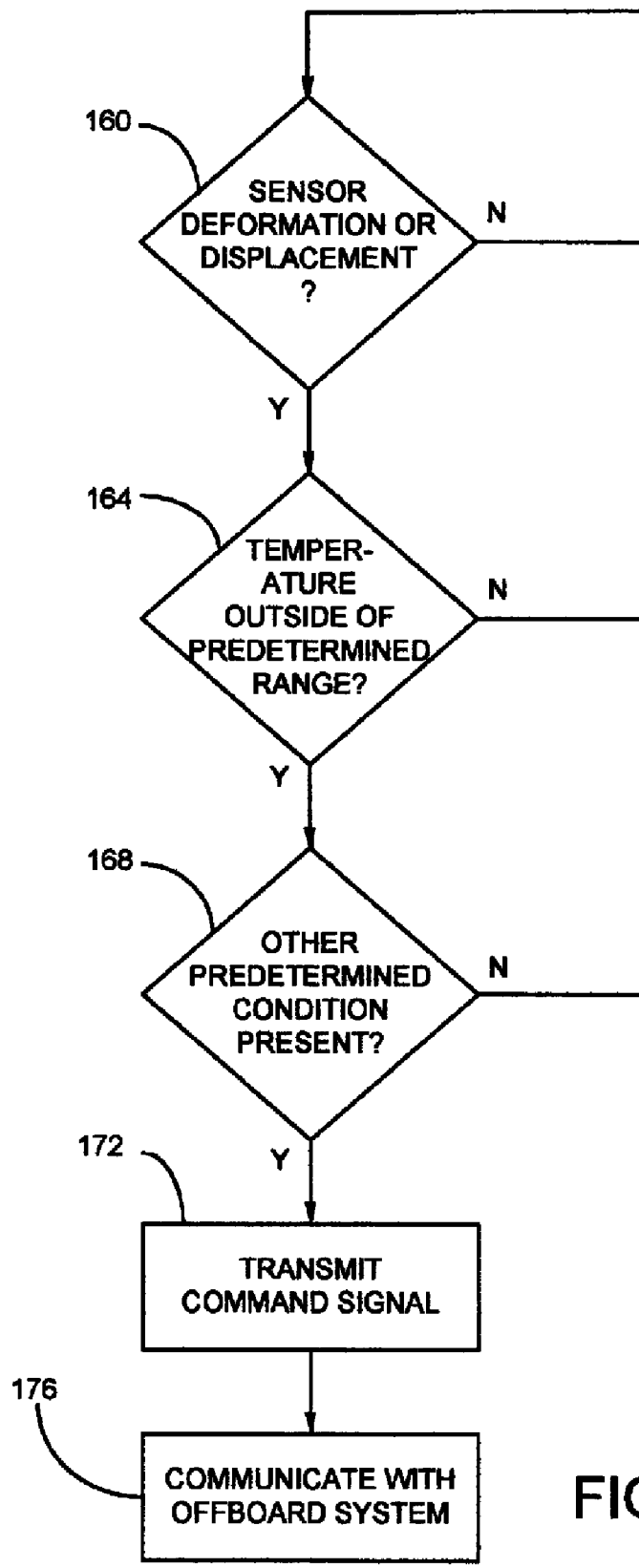
FIG. 3 is a schematic flow diagram of a method of using the motion detection system of FIG. 2.

FIG. 3 schematically depicts a method of operation for the motion detection system 90. The method of FIG. 3 also represents an exemplary control logic for the controller 94. Referring to FIGS. 2 and 3, the controller 94 inquires whether any of sensors 82, 86 is being deformed as a result of movement of an object inside the passenger compartment or trunk at step 160. The controller determines the answer to the inquiry at step 160 by determining whether the receiver 112 is transmitting signal 114. If the signal 114 is present, then the answer to the inquiry at step 160 is yes. If the signal 114 is not present, then the answer to the inquiry at step 160 is no. If the answer to the inquiry at step 160 is no, then the controller 94 repeats step 160. If the answer to the inquiry at step 160 is yes, then the controller proceeds to step 164.

At step 164, the controller 94 inquires whether the temperature inside the passenger compartment is above a first predetermined temperature or below a second predetermined temperature based on signal 120. If the answer to the inquiry at step 164 is no, then the controller 94 returns to step 160. If the answer to the inquiry at step 164 is yes, then the controller proceeds to step 168.

At step 168, the controller 94 inquires whether at least one other predetermined condition exists, as determined by the sensors 124. Exemplary predetermined conditions may include whether the engine is off, whether the ignition switch is in the off position, whether any of the vehicle doors is open, whether the transmission selector is in its "park" position, whether any of the vehicle doors has been open within a predetermined period of time prior to the inquiry at step 168, etc. If the answer to the inquiry at step 168 is no, then the controller returns to step 160. If the answer to the inquiry at step 168 is yes, then the controller proceeds to step 172. It should be noted that steps 160, 164, and 168 may be performed in any order within the scope of the claimed invention.

At step 172, the controller transmits command signals 132 to one or more components 128 thereby to cause a physical response in the one or more components, which may include the generation of sound, the movement of a vehicle component, etc. For example, the controller 94 may transmit a command signal 132 to a window regulator to cause the regulator to move a door window from its closed position to its open position, particularly, if the temperature of the passenger compartment is above a predetermined temperature. The controller may transmit a command signal 132 to the doors (shown at 22 in FIG. 1) to unlock the doors. The controller may transmit a command signal 132 to an alert system that produces an audible sound in response to the command signal. The vehicle's horn may be used as an alert system. Similarly, the audio system speakers of the vehicle body may be used to generate the audible sound (particularly in conjunction with opening the windows). The controller may transmit a command signal 132 to child locks to disengage the child locks. The controller may transmit command signals 132 to actuators to open doors, a sunroof (not shown), the rear decklid (shown at 78 in FIG. 1), a rear liftgate (not shown), etc. The controller may transmit a command signal to cause the vehicle's headlights or tail lights to flash.

The method may also include communicating with the offsite station 144 at step 176, such as by transmitting a command signal 140A to the telematics transmitter 136, thereby causing the telematics transmitter 136 to transmit signal 140 to the offboard station 144 to alert the offboard station 144 that movement of an object is detected within the passenger compartment or trunk, the temperature within the passenger compartment is above the first predetermined temperature or below the second predetermined temperature, and at least one other predetermined condition exists. Signal 140 may also include information such as the vehicle's location, a unique identifier of the vehicle or the vehicle's registered owner, etc. The offboard station may then transmit signals 152A to the telematics receiver 148, causing the telematics receiver 148 to transmit instruction signals 152 to the controller 94. The controller 94 is responsive to the instruction signals 152 to transmit command signals 132. The offboard station 144 may be automated, or may be operated by a human operator. The offboard station 144 may determine which of components 128 are commanded by signals 132 based on varying circumstances, and may also perform other steps in response to receiving signal 140, such as determining the location of the vehicle body and notifying an entity of the condition.

For example, the entity notified may be police or other law enforcement agency, the registered owner of the vehicle (via the registered owner's cellular telephone), a business located in close proximity to the vehicle (via telephone), persons outside the vehicle (notified by opening the vehicle windows and causing a message to be broadcast via the vehicle's audio system speakers), another driver with a telematics system in close proximity to the vehicle, etc. Accordingly, it may be desirable for the system 90 to include a global positioning system (GPS) such that the location of the vehicle is transmitted to the offsite station 144. The offboard station 144 may also receive signals from a microphone located inside the passenger compartment (not shown) via the transmitter 136 to monitor sound inside the compartment and determine a course of action. The offboard station 144 may also attempt remote communication with the passenger compartment, such as by transmitting voice signals to a speaker inside the passenger compartment.

In an alternative embodiment, the controller 94 may be programmed to perform steps 172 and 176 in response to other sensors indicating that predetermined conditions exist, independent of the temperature of the passenger compartment, and, potentially, independent of sensor 82, 86 deformation or displacement. For example, the vehicle may include a sensor configured to monitor the gas composition inside the passenger compartment and to transmit a signal indicative of the gas composition to the controller 94. If the controller 94 determines that one or more predetermined gases is present above a predetermined level inside the passenger compartment, then the controller performs step 172 or 176. The vehicle may include a sensor configured to monitor whether there is water entering the vehicle and to communicate whether water is entering the vehicle to the controller 94. If the controller 94 determines that water is entering the vehicle, then the controller performs step 172 or 176. Similarly, a sensor may be configured to monitor particulate matter in air of the passenger compartment and communicate the amount of particulate matter to the controller 94. If the controller 94 determines that the amount of particulate matter exceeds a predetermined level, then the controller 94 performs steps 172 or 176.

It should be noted that the system 90 may have only one sensor 82, 86 within the scope of the claimed invention. However, as depicted in FIG. 1, it is desirable for the vehicle 10 to include multiple sensors 82, 86 so that movement associated with background vibration of the vehicle, as a result of raindrops, wind, passing vehicles, etc., does not cause the controller 94 to perform steps 176, 174. Accordingly, filtering or other processing is preferably performed by the controller 94 in the method shown in FIG. 3 to prevent the occurrence of steps 172 and 176 as a result of background vibration. For example, and within the scope of claimed invention, step 160 may include inquiring whether less than all of the sensors 82, 86 are being deformed or displaced, whether the displacement or deformation of the sensors 82, 86 is occurring at different times, etc., with the controller 94 proceeding to step 164 only if the answer to the inquiry is affirmative. The sensors 82, 86, transmitters 98, 100, and receiver 112 are configured such that the signal 114 transmitted to the controller 94 is unique for each of the sensors 82, 86 so that the controller 94 can distinguish which of the sensors 82, 86 are being deformed or displaced.

It should be noted that sensors 82 and transmitters 98, and, optionally, components 180, 180A, 196, may be mounted with respect to a system that is selectively removable from the passenger compartment, such as a portable and/or removable seating system, a cargo storage container, etc. It should also be noted that, in an alternative embodiment, the temperature sensor may be operatively connected to a transmitter 98 such that signal 104 is transmitted only when the temperature sensor detects that the temperature is above a first predetermined temperature or below a second predetermined temperature. Accordingly, in such an embodiment, the receipt of signal 114 by the controller 94 would allow the controller 94 to determine that the answers to the inquiries in steps 160 and 164 are yes.

In an alternative method, the controller may also inquire, between steps 168 and 170, whether a first predetermined amount of time has passed since the occurrence of some event, such as the closure of a vehicle door or the movement of the ignition switch from the on position to the off position. If the controller determines that the first predetermined amount of time has passed, then the controller transmits a command signal to cause a first condition, such as transmitting a signal to the vehicle owner's key fob to which the key fob is responsive to create an alert, such as vibrations or sound audible to the vehicle owner. The controller may also inquire whether a second predetermined amount of time, greater than the first predetermined time, has passed since the occurrence of the event. If the controller determines that the second predetermined amount of time has passed, then the controller transmits a command signal to cause a second condition, such as the conditions or actions described with respect to steps 172 and 176. It may also be desirable for the controller 94 to end the method if movement is not detected by the sensors 82, 86 within a predetermined amount of time since the occurrence of the event, e.g., 30 minutes.

It should be noted that the systems described herein may or may not be used in combination with other object detection systems such as vision, radar, ultrasonic, etc.

Figure 4:
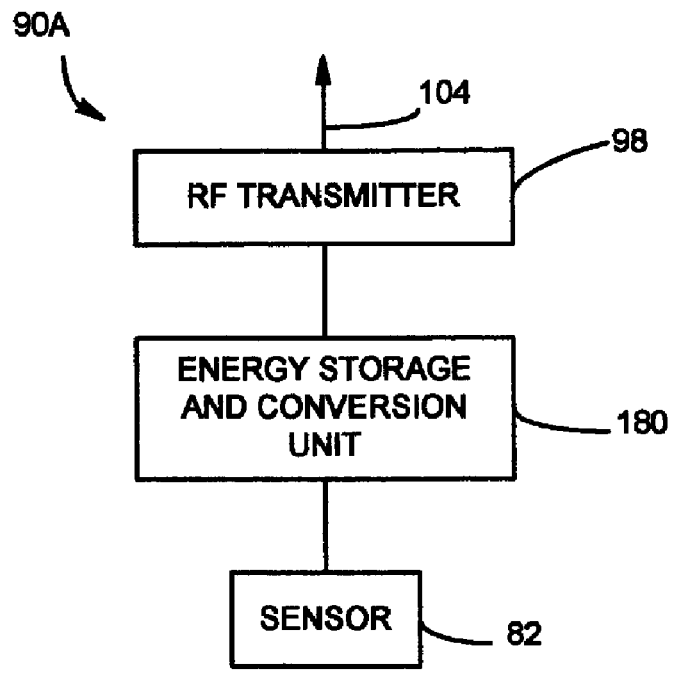
FIG. 4 is a schematic depiction of an alternative sensor configuration for use with the motion detection system of FIG. 2.

Referring to FIG. 4, wherein like reference numbers refer to like components from FIGS. 1-3, a portion of an alternative embodiment of the motion detection system 90A is schematically depicted. Motion detection system 90A is substantially identical to the motion detection system of FIG. 2, except that sensor 82 is operatively connected to an energy storage and conversion unit 180 to transmit the charge or current generated by deformation or dislocation of the sensor 82 thereto. The energy storage and conversion unit 180 is operatively connected to the radio frequency transmitter 98. The unit 180 is configured to store energy from the sensor 82, such as within a capacitor or chemical battery (not shown), and to transmit the stored energy to the transmitter 98 to power the transmission of signal 104. The unit 180 may be advantageous because it accumulates energy from the sensor 82 and may therefore provide more power to the transmitter 98 than if the sensor 82 transmits electrical energy directly to the transmitter 98. For example, the unit 180 may store energy received from the sensor 82 until sufficient energy is stored to power the transmitter 98, in the event that the electrical power produced by the sensor 82 is not sufficient to transmit signal 104. The unit 180 may also convert the energy from the sensor 82 to voltages and currents that are more appropriate for the transmitter 98 to use in generating signals 104.

Figure 5:
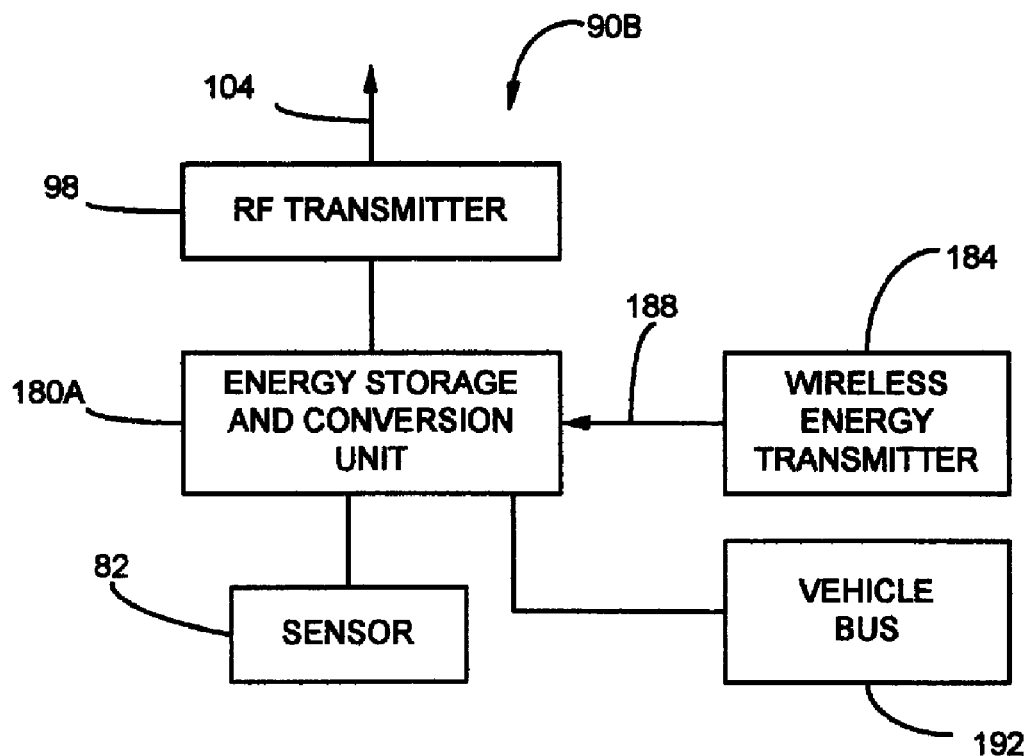
FIG. 5 is a schematic depiction of another alternative sensor configuration for use with the motion detection system of FIG. 2.

Referring to FIG. 5, wherein like reference numbers refer to like components from FIGS. 1-4, another portion of an alternative motion detection system 90B is schematically depicted. System 90B is substantially identical to system 90A of FIG. 4, except that the energy storage and conversion unit 180A is powered by a wireless energy transmitter 184 that wirelessly transmits energy 188 to the unit 180A. Transmitter 184 may be, for example, any RF transmitter, such as from an internal vehicle bluetooth or wireless transmission system, a radio frequency identification (RFID) type interrogator, etc. Transmitter 184 may also provide an inductive coupling with the unit 180A to transmit energy 188 thereto. The energy 188 transmitted by the transmitter 184 can be used to supplement the energy generated by sensor 82 when the energy generated by the sensor 82 is not sufficient to power the transmitter 98. Alternatively, the unit 180A may be connected to the vehicle power system via the vehicle bus 192, and therefore receive electrical energy through a conductive medium. The unit 180A may also store energy from the transmitter 184 or the bus 192. Power transmitted by the transmitter 184 or the vehicle bus 192 enables the use of sensor materials such as resistive structures, e.g., graphite-filled elastomers, and in general materials with very high extension where the resistance changes dramatically with strain, and with which a very small current provides a voltage reading.

Figure 6:
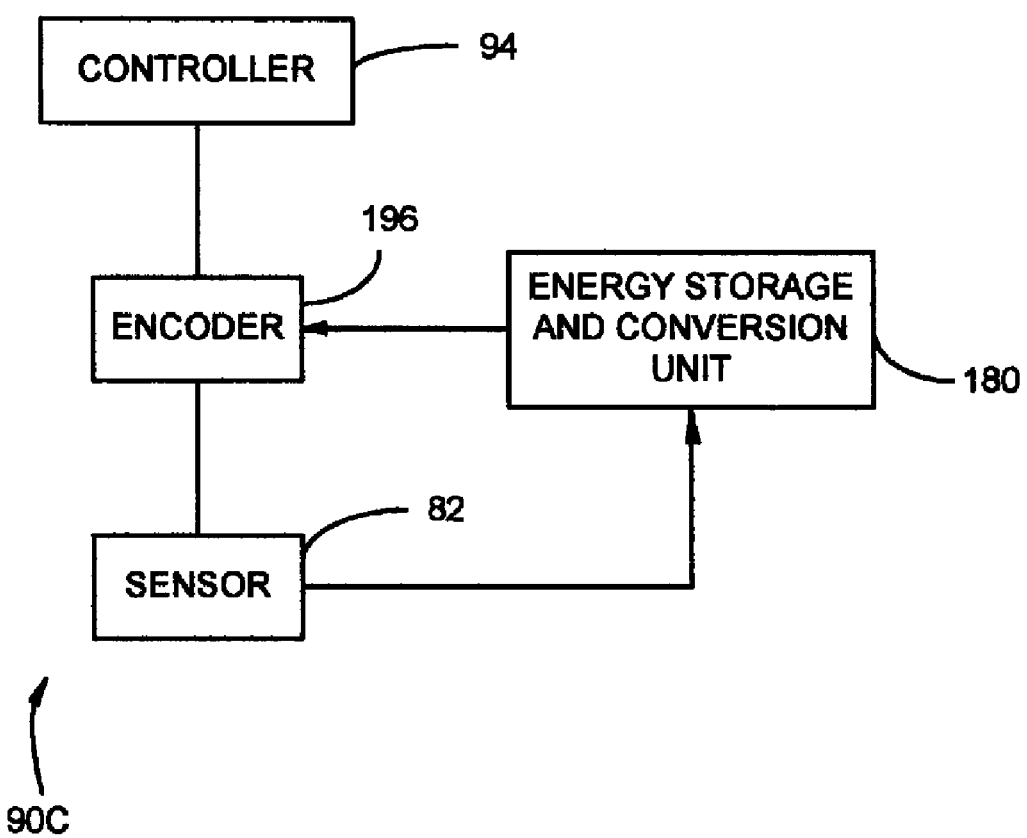
FIG. 6 is a schematic depiction of yet another alternative sensor configuration for use with the motion detection system of FIG. 2.

Referring to FIG. 6, wherein like reference numbers refer to like components from FIGS. 1-5, a portion of yet another alternative motion detection system 90C is schematically depicted. The motion detection system 90C is substantially identical to the motion detection system 90 of FIG. 2, except that the radio frequency transmitter 98 is replaced with an encoder 196. The encoder 196 is operatively connected to the controller 94 via a conductive path such as wires, and is configured to convert the electrical current generated by the sensor 82 to conform to the communication protocols on the vehicle information bus. This function is built into the transmitters 98, 100. Alternatively, the sensor 82 may transmit energy to an energy storage and conversion unit 180, which is powered from the vehicle electrical system, and which transmits signals to the encoder 196. System 90C may provide long-term power storage for the condition in which the vehicle is off.

An auxiliary battery (not shown) may also be employed in the event that boosting of the RF signal 104 is desirable, such as in the case where the amount or frequency of displacement of the sensor 82 decreases with time, or in the case where the charge generation of the sensor becomes less efficient due to, e.g., high or low temperatures.

Power for the transmitters may also be generated with a mechanical system, e.g., a spring that is compressed or wound by a ratchet due to motion of the vehicle. The energy generated by such a mechanical system could be released to charge a battery or capacitor, perhaps through motion of a magnet in a coil, when the temperature is out of specific bounds, e.g., using a shape memory material trigger. The charged battery would then power the sensor/transmitter combination.

FIGS. 7a-9e, wherein like reference numbers refer to like components, schematically depict systems that employ shape memory materials that simultaneously detect force (caused by the presence of an object in a passenger compartment) and temperature (by changing their response to stress). The shape memory materials are operatively connected to electrical circuits such that the state of the circuits (i.e., open or closed) is dependent on the amount of force and the temperature sensed by the shape memory materials. Alert systems are operatively connected to the circuits, and the state of the alert systems (i.e., activated or unactivated) is dependent on the state of the circuit.

FIGS. 7a-d schematically depict a system 200 for detecting the presence of an object in a vehicle passenger compartment when the temperature inside the passenger compartment is below a predetermined temperature. The system 200 includes a vehicle seat 204 inside a passenger compartment, such as the passenger compartment shown at 42 in FIG. 1. The vehicle seat 204 is mounted with respect to a vehicle floor via springs 208 such that the vertical distance of the seat 204 from the floor varies with the amount of weight supported by the seat 204. That is, the springs 208 are compressible and therefore enable the seat 204 to move vertically.

The system 200 includes an electric power source such as battery 212. Conductive path 216 operatively interconnects a shape memory alloy (SMA) member 220 with the battery 212 to provide electrical communication therebetween. Conductive path 224 operatively interconnects the battery 212 with an alert system 228 to provide electrical communication therebetween. Conductive path 232 operatively interconnects the alert system 228 with an electrical contact 240 to provide electrical communication therebetween. One end of the SMA member 220 is fixed with respect to the vehicle body 14 at one end, such as at the seat frame, and the other end of the SMA member is mounted with respect to, and in electrical communication with, electrical contact 236. Those skilled in the art will recognize a variety of materials that may be employed to form the conductive paths 216, 224, 232, such as electrically conductive wires.

The seat 204 is operatively connected to the electrical contact 236 to transmit force to the electrical contact 236 and, correspondingly, to transmit force to the SMA member 220. In an exemplary embodiment, a rigid member 244 is mounted to the seat 204 and to the electrical contact 236 to receive vertical forces from the seat 204 and transmit the forces to the electrical contact 236 and to the SMA member 220. Other devices or techniques may be employed to transmit downward force from the seat 204 to the contact 236, such as gearing, levers, etc.

A shape memory alloy is characterized by a cold state, i.e., when the temperature of the alloy is below its martensite finish temperature $M_f$. A shape memory alloy is also characterized by a hot state, i.e., when the temperature of the alloy is above its austenite finish temperature $A_f$. An object formed of shape memory alloy may be characterized by a predetermined shape. When the object is plastically deformed in the cold state, the strain may be reversed by heating the object above its austenite finish temperature $A_f$, i.e., heating the object above its $A_f$ will cause the object to return to its predetermined shape. An SMA's modulus of elasticity and yield strength are also significantly lower in the cold state than in the hot state.

The battery 212, alert system 228, conductive paths 216, 224, 232, SMA member 220, and contacts 236, 240 form an electrical circuit. At room temperature, e.g., 70° F., and with the absence of any object on the seat 204, the contacts 236, 240 are spaced a predetermined distance D1 apart, and the circuit is open, as shown in FIG. 7a. The SMA member 220 is elongatable in response to tensile stress. When a downward force is exerted on the seat 204, such as the weight of an object on the seat 204, the force is transferred to the SMA member 220 via member 244, resulting in tensile stress on the SMA member 220 and, accordingly, tensile strain of the member 220, i.e., elongation.

Figure 7E:
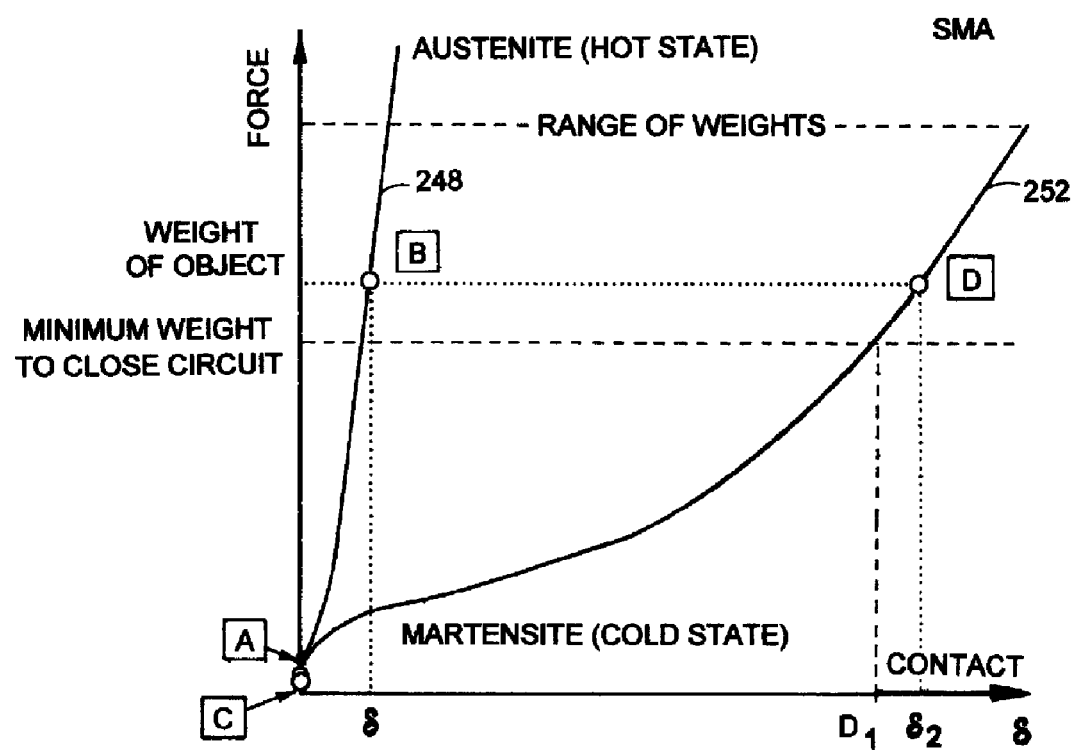
FIG. 7e is a graphic depiction of the relationship between force exerted on the seat of FIGS. 7a-7d and the elongation of a member in the system of FIGS. 7a-7d.

Referring to FIG. 7e, the relationship between the amount of downward force exerted on the seat 204 and the amount of elongation of the shape memory alloy member 220 in its hot state is schematically depicted by line 248. The relationship between the amount of downward force exerted on the seat 204 and the amount of elongation of the shape memory alloy 220 in its cold state is schematically depicted by line 252. The SMA member 220 is characterized by a lower modulus of elasticity and yield strength in the cold state than in the hot state, and therefore, the amount of elongation of member 220 for any given force on the seat is greater when the member 220 is in the cold state than in the hot state.

Referring to FIGS. 7a and 7e, the amount of downward force exerted on the seat 204 is zero, and, accordingly, the amount of elongation of the member 220 is zero, as depicted at point A on the graph of FIG. 7e. FIG. 7b depicts the system 200 when an object 256 is supported on the seat 204 and the temperature inside the passenger compartment, and the temperature of the SMA member 220, is approximately room temperature so that the SMA member 220 is in its hot state. The SMA member 220 is preferably inside the passenger compartment or in thermal communication with the passenger compartment so that the member 220 is substantially the same temperature as the passenger compartment. The object 256 exerts a downward force F on the seat 204 equal to the weight of the object 256. The force F is transmitted to the SMA member 220 by the member 244, causing elongation of the member 220. The amount of elongation of the member 220 is $\delta_1$, as depicted at point B on the graph of FIG. 7e. The amount of elongation $\delta_1$ is less than D1, and thus the contacts 236, 240 are separated by a distance D2, which is equal to D1-$\delta_1$.

Referring to FIG. 7c, the temperature inside the passenger compartment, and the temperature of the SMA member 220, is below the martensite finish temperature, and therefore the SMA member 220 is in its cold state. The system 200 is depicted without object 256 on the seat 204, and therefore the amount of tensile stress exerted on the SMA member 220 is zero. Accordingly the amount of elongation of the SMA member 220 is zero, as depicted at point C on the graph of FIG. 7e.

Referring to FIG. 7d, the temperature of the passenger compartment and the SMA member 220 is below the martensite finish temperature of the SMA member 220, and therefore the SMA member 220 is in its cold state. The object 256 is supported on the seat 204, and exerting a downward force F, i.e., its weight, thereon. The force is transferred to the SMA member 220 by the rigid member 244, resulting in elongation of the SMA member 220. Referring to FIGS. 7d and 7e, point D on the graph of 7E represents the conditions present in FIG. 7d. The weight of the object 256 is sufficient to cause the SMA member 220 in its cold state to elongate by an amount $\delta_2$, which is greater than distance D1. Accordingly, contact 236 contacts 240, and the circuit is closed, thereby activating the alert system 228.

It should be noted that a minimum amount of force or weight must be exerted on the seat 204 before the amount of elongation of the SMA member 220 in the cold state will be at least as large as D1 to cause contact between contacts 236, 240 and the resulting activation of the alert system 228. This minimum amount of force or weight can be altered by varying the distance between the contacts 236, 240 when the SMA member 220 is unstressed, and by varying the dimensions of the SMA member 220. For example, a greater thickness of SMA member 220 will result in lower stress and lower strain for a given force than a lower thickness of SMA member 220, as understood by those skilled in the art. It may be desirable to ensure that the system 200 is sufficiently configured such that a maximum expected weight on the seat 204 will not result in elongation of the SMA member in its hot state greater than D1.

System 200 is reversible; that is, the SMA member 220 reverts to its predetermined length (as depicted in FIG. 7a) when the seat 204 is unloaded and the SMA member 220 is in its hot state.

FIGS. 8a-8d schematically depict a system 260 configured to detect the presence of an object in a passenger compartment when the temperature of the passenger compartment is above a predetermined temperature. System 260 includes a vehicle seat 204 inside a passenger compartment, such as the passenger compartment shown at 42 in FIG. 1. The vehicle seat 204 is mounted with respect to a vehicle floor via springs 208 such that the vertical distance of the seat 204 from the floor varies with the amount of weight supported by the seat 204. That is, the springs 208 are compressible and therefore enable the seat 204 to move vertically.

The system 260 includes an electric power source such as battery 212. Conductive path 216 operatively interconnects an electrical contact 236 with the battery 212 to provide electrical communication therebetween. Conductive path 224 operatively interconnects the battery 212 with an alert system 228 to provide electrical communication therebetween. Conductive path 232 operatively interconnects the alert system 228 with an electrical contact 240 to provide electrical communication therebetween. Those skilled in the art will recognize a variety of materials that may be employed to form the conductive paths 216, 224, 232, such as electrically conductive wires.

Electrical contacts 236 and 240 are mounted at opposite ends 262, 263 of a C-shaped hinge 264. The hinge 264 is comprised of a shape memory polymer (SMP). Shape memory polymers are known in the art and generally refer to a group of polymeric materials that demonstrate the ability to return to some previously defined shape when subjected to an appropriate thermal stimulus. Shape memory polymers are capable of undergoing phase transitions in which their shape is altered as a function of temperature. Generally, SMPs have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature (Tg) or melting point of the hard segment. A temporary shape can be set by heating the material to a temperature higher than the Tg or the transition temperature of the soft segment, but lower than the Tg or melting point of the hard segment. The temporary shape is set while processing the material at the transition temperature of the soft segment followed by cooling to fix the shape. The material can be reverted back to the permanent shape by heating the material above the transition temperature of the soft segment. Shape memory polymers could be used in various forms, such as sheet, slab, fiber, foam, etc. As in the case of shape memory alloys, the glass transition temperature can be tunable within a certain range. Shape memory polymers exhibit a dramatic drop in modulus when heated above the glass transition temperature ($T_g$). The primary property of the SMP as used herein is the ability to keep its stiffness at room temperature and lose its stiffness when it is heated.

The seat 204 is operatively connected to the hinge 264 to transmit force thereto. In an exemplary embodiment, a rigid member 244 is mounted to the seat 204 and to the hinge 264 to receive vertical forces from the seat 204 and transmit the forces to the hinge 264.

The battery 212, alert system 228, conductive paths 216, 224, 232, and contacts 236, 240 form an electrical circuit. At room temperature, e.g., 70° F., and with the absence of any object on the seat 204, the contacts 236, 240 are spaced a predetermined distance D1 apart, and the circuit is open, as shown in FIG. 8a. The SMP hinge 264 is deformable in response to stress. When a downward force is exerted on the seat 204, such as the weight of an object on the seat 204, it is transferred to the hinge 264 via member 244, resulting in stress on the hinge 264 and, accordingly, strain of the hinge 264. More specifically, the member 244 transmits force to the hinge 264 that causes the hinge 264 to bend, thereby reducing the distance between the electrical contacts 236, 240.

Figure 8E:
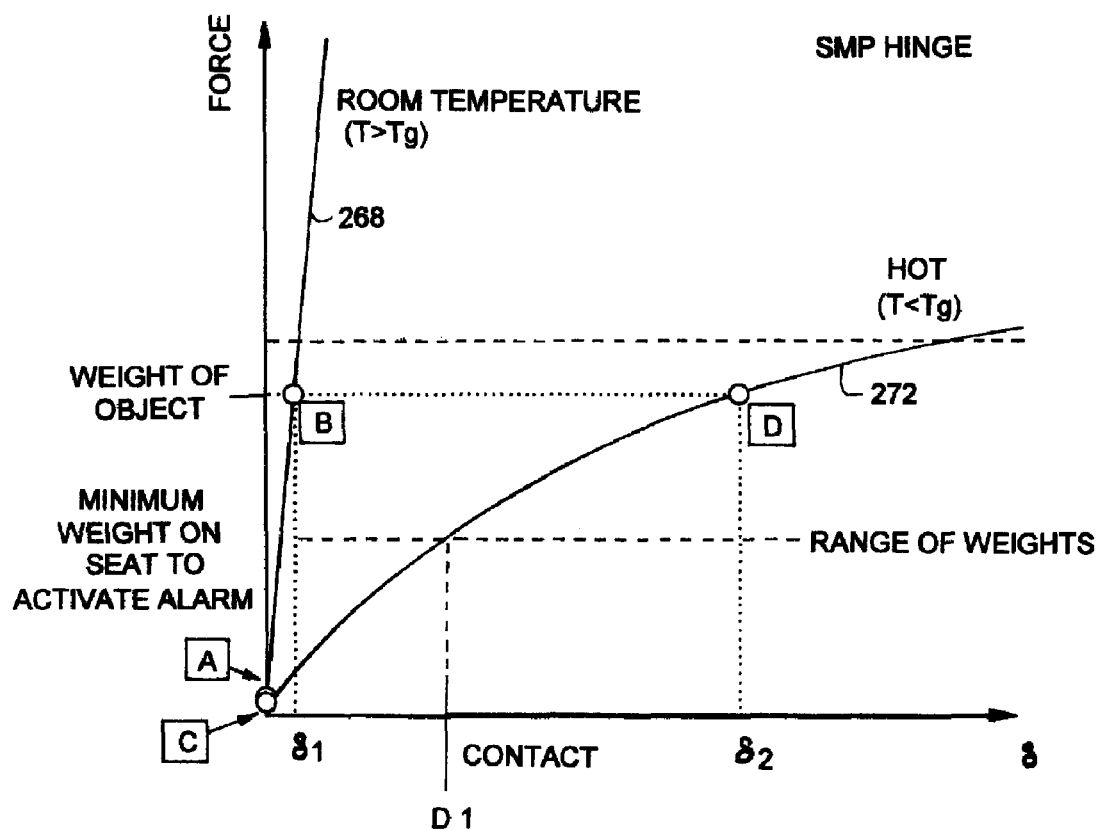
FIG. 8e is a graphic depiction of the relationship between force exerted on the seat of FIGS. 8a-8d and the displacement of a member in the system of FIGS. 8a-8d.

Referring to FIG. 8e, line 268 schematically depicts the relationship between the amount of bending deformation of the hinge 264 when it is below its glass transition temperature and the amount of downward force exerted on the seat 204. More specifically, line 268 depicts the displacement of the end 262 of the hinge 264 having contact 236 mounted thereto from its position shown in FIG. 8a, in which the hinge 264 is in its unstressed, predefined shape.

Line 272 schematically depicts the relationship between the amount of bending deformation (displacement of the end 262) of the hinge 264 when it is above its glass transition temperature and the amount of downward force exerted on the seat 204. More specifically, line 272 depicts the displacement of the end 262 of the hinge 264 having contact 236 mounted thereto from its position shown in FIG. 8a, in which the hinge 264 is in its unstressed, predefined shape. In FIG. 8a, the contacts 236, 240 are a predetermined distance D1 apart.

In FIGS. 8a and 8b, the temperature inside the passenger compartment, and therefore the temperature of the SMP hinge 264, is below the glass transition temperature of the hinge 264. Accordingly, line 268 of FIG. 8e represents the behavior of the hinge 264 in FIGS. 8a and 8b. The glass transition temperature of the hinge 264 is set to a predetermined temperature that is significantly higher than room temperature, such as between 80 and 100° C.

Referring to FIGS. 8a and 8e, the amount of downward force exerted on the seat 204 is zero, and therefore member 244 exerts no stress on the hinge 264 and the amount of displacement of contact 236 is zero, as depicted at point A on the graph of FIG. 8e. FIG. 8b depicts the system 260 when an object 256 is supported on the seat 204. The object 256 exerts a downward force F on the seat 204 equal to the weight of the object 256. The force F is transmitted to the hinge 264 by the member 244, causing the hinge 264 to bend so that the distance between ends 262, 263, and therefore the distance between the contacts 236, 240, decreases. The amount of displacement of end 262 and contact 236 as a result of the stress exerted on the hinge 264 by member 244 is $\delta_1$, as depicted at point B on the graph of FIG. 8e. The amount of displacement $\delta_1$ is less than D1, and thus the contacts 236, 240 are separated by a distance D2, which is equal to D1-$\delta_1$. It should be noted that conductive path 216 is sufficiently configured to maintain conductivity between the contact 236 and the battery 212 during movement of the contact 236. For example, the conductive path 216 may be wire having sufficient slack to accommodate movement of the contact 236.

Referring to FIGS. 8c and 8d, the temperature inside the passenger compartment, and the temperature of the SMP hinge 264, is above the glass transition temperature of the SMP hinge 264, and therefore the stiffness of the hinge 264 is less than the stiffness of the hinge in FIGS. 8a and 8b. Line 272 in FIG. 8e represents the bending behavior of the hinge in FIGS. 8c and 8d. Referring specifically to FIG. 8c, the system 260 is depicted without object 256 on the seat 204, and therefore the amount of force on the hinge 264 is zero. Accordingly, the amount of displacement of contact 236 is zero, as depicted at point C on the graph of FIG. 8e, and the contacts 236, 240 are spaced apart by distance D1.

Referring specifically to FIG. 8d, the object 256 is supported on the seat 204 and is exerting a downward force F, i.e., its weight, thereon. The force F is transferred to the hinge 264 by the rigid member 244, resulting in bending of the SMP hinge 264. Referring to FIGS. 8d and 8e, point D on the graph of FIG. 8e represents the conditions present in FIG. 8d. The weight of the object 256 is sufficient to cause the SMP hinge 264 above its glass transition temperature to bend sufficiently to displace contact 236 by an amount $\delta_2$, which is greater than distance D1. Accordingly, contact 236 contacts 240, and the circuit is closed, thereby activating the alert system 228.

It should be noted that a minimum amount of force or weight must be exerted on the seat 204 before the amount of displacement of the contact 236 will be at least as large as D1. This minimum amount of force or weight can be altered by varying the distance between the contacts 236, 240 when the SMP hinge 264 is unstressed, and by varying the dimensions of the SMP hinge 264. It may be desirable to ensure that the system 260 is sufficiently configured such that a maximum expected weight on the seat 204 will not result in bending of the SMP hinge 264 sufficient to cause displacement of the contact 236 greater than D1 when the SMP hinge 264 is below its glass transition temperature.

System 260 is substantially reversible; that is, the hinge 264 can recover its predetermined shape at room temperature (below the glass transition temperature) when the seat 204 is unloaded. A spring (not shown) may be employed to bias the hinge toward its predetermined shape after deformation.

FIGS. 9a-d schematically depict a system 276 for detecting the presence of an object in a vehicle passenger compartment when the temperature inside the passenger compartment is above a predetermined temperature. The system 276 includes a vehicle seat 204 inside a passenger compartment, such as the passenger compartment shown at 42 in FIG. 1. The vehicle seat 204 is mounted with respect to a vehicle floor via springs 208 such that the vertical distance of the seat 204 from the floor varies with the amount of weight supported by the seat 204. That is, the springs 208 are compressible and therefore enable the seat 204 to move vertically.

The system 276 includes an electrical circuit 280 operatively connected to an alert system 284. The circuit 280 includes a conductive path 288 operatively interconnecting a shape memory alloy (SMA) member 292 with the alert system 284 to provide electrical communication therebetween. The SMA member 292 is electrically conductive and provides electrical connectivity between the path 288 and a fuse member 296. The fuse member is electrically conductive and is configured to fracture at a predetermined tensile load. The fuse member provides electrical connectivity between the SMA member 292 and a conductive path 300. Conductive path 300 provides electrical connectivity between the fuse member 296 and the alert system 284. SMA member 292 and fuse member 296 are substantially rigidly connected to one another.

One end 304 of the SMA member 292 is fixed with respect to the vehicle body. The seat 204 is operatively connected to one end of the fuse member 296 to transmit force to fuse member 296 and, therefore, to transmit force to the SMA member 292. In an exemplary embodiment, a rigid member 244 is mounted to the seat 204 and to the fuse member 296 to receive vertical forces from the seat 204 and transmit the forces to the fuse member 296 and to the SMA member 292. A downward force on the seat 204 is transmittable by member 244 to the fuse member and the SMA member to cause the fuse member and the SMA member to be in tension.

The SMA member 292 is configured such that its austenite finish temperature is above room temperature, e.g., between 80 and 100° C. Accordingly, at room temperature, e.g., about 70° F., as depicted in FIGS. 9a and 9b, the SMA member 292 is in its cold state (martensitic phase). FIGS. 9c and 9d depict the system 276 when the passenger compartment, and the SMA member 292, are above the austenite finish temperature of the SMA member 292, and the SMA member 292 is in its hot state (austenitic phase).

The SMA member 292 is elongatable in response to tensile stress. When a downward force is exerted on the seat 204, such as the weight of an object on the seat 204, the force is transferred to the SMA member 292 via member 244 and fuse member 296, resulting in tensile stress on the SMA member 292 and, accordingly, tensile strain of the member 292, i.e., elongation.

Figure 9E:
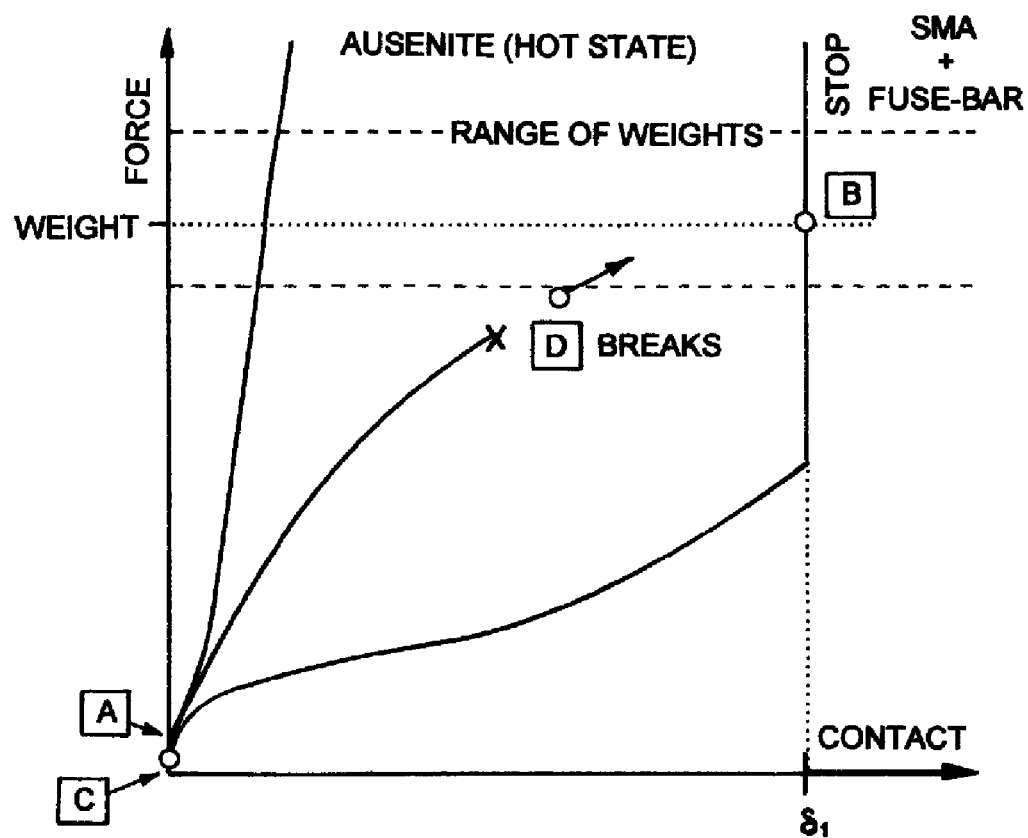
FIG. 9e is a graphic depiction of the relationship between force exerted on the seat of FIGS. 8a-8d and the displacement of a member in the system of FIGS. 9a-9d.

FIGS. 9a and 9b depict the system 276 when the temperature inside the passenger compartment, and the temperature of the SMA member 220, is approximately room temperature so that the SMA member 292 is in its cold state. Referring specifically to FIG. 9a, the amount of downward force exerted on the seat 204 is zero, and, accordingly, no force is transmitted to the fuse member 296 and the SMA member 292 by member 244. With no stress exerted on the members 296, 292, the amount of elongation of the member 292 is zero, as depicted at point A on the graph of FIG. 9e.

Referring specifically to FIG. 9b, the object 256 exerts a downward force F on the seat 204 equal to the weight of the object 256. The force F is transmitted to the SMA member 292 by the member 244 via the fuse member 296, causing elongation of the SMA member 292. A stop member 308 is rigidly mounted with respect to the vehicle body and is positioned relative to the fuse member 296 and the member 244 to limit elongation of the SMA member 292 to amount $\delta_1$, as depicted at point B on the graph of FIG. 9e. That is, the stop member 308 is positioned to exert a reaction force on the fuse member 296 and the member 244 when the SMA member 292 has elongated by $\delta_1$. The reaction force provided by stop member 308 prevents the fuse member 296 from being subjected to the full force (i.e., weight) of the object 256 in tension, and the fuse member 296 does not experience sufficient tensile stress to fracture.

Referring to FIGS. 9c and 9d, the temperature inside the passenger compartment, and the temperature of the SMA member 292, is above the austenite finish temperature, and therefore the SMA member 220 is in its hot state, with a higher modulus than in the cold state. Accordingly, the SMA member 292 will elongate less in the hot state with a given amount of stress than in the cold state. Referring specifically to FIG. 9c, the system 276 is depicted without object 256 on the seat 204, and therefore the amount of downward force on the SMA member 292 and the fuse member 296 is zero. Accordingly, the amount of elongation of the SMA member 292 is zero, as depicted at point C on the graph of FIG. 9e.

Referring to FIG. 9d, the object 256 is supported on the seat 204, and is exerting a downward force F, i.e., its weight, thereon. The force F is transferred to the SMA member 292 and the fuse member 296 by the rigid member 244, resulting in elongation of the SMA member 292. However, although the tensile stress on the SMA member 292 caused by the presence of object 256 is the same as in FIG. 9b, the strain, i.e., elongation, exhibited by the SMA member 292 is less than in FIG. 9b, and is not sufficient to cause the reaction force of the stop member. Therefore, the fuse member 296 is subjected to the full weight of the object 256, and the resulting tensile stress on the fuse member 296 is sufficient to cause it to fracture, as shown in FIG. 9d. The conditions shown in FIG. 9d are represented by point D in the graph of FIG. 9e.

When the fuse member 296 fractures, it separates into two pieces 296A, 296B and the circuit 280 becomes open. A logic system in the alert system 284 is configured to sense that the circuit 280 is open and, in response, activate the alert system 284.

The alert systems 228, 284 may be configured to provide notification when they are activated. For example, the alert systems 228, 284 may be configured to sound the vehicle's horn; activate a siren; flash headlights, brake lights, or other lights; notify others via a wireless communication link, such as via satellite, cellular telephone system, or other radio system; etc. The alert systems 228, 284 may also be configured to alter the temperature or to facilitate access to the passenger compartment when activated. For example, the alert systems 228, 284 may be configured to cause actuators to move door windows or sunroofs to their open positions, release seat belt buckles, unlock vehicle doors, cause a ventilation system fan to operate, activate the vehicle's heating or cooling system, etc.

While the best modes for carrying out the invention have been described in detail, those familiar with the art to which this invention relates will recognize various alternative designs and embodiments for practicing the invention within the scope of the appended claims.

The invention claimed is:

1. A system for detecting an animate object inside a vehicle compartment comprising:
    a vehicle body defining the vehicle compartment;
    a controller;
    a first sensor defining an electrical circuit including a shape memory alloy, a first contact and a second contact;
    wherein the shape memory alloy is fixedly connected to at least one of the first and second contacts and is configured to selectively change a distance between the first and second contacts;
    the first sensor being mounted with respect to the vehicle body to receive mechanical energy from a moving animate object inside the vehicle compartment and transmit the mechanical energy to the shape memory alloy; and being configured to generate an electrical charge or current by converting the mechanical energy to electrical energy when an electrical connection between the first and second contacts is changed from one of:
        open to closed; and
        closed to open;
        by changing the distance between the first contact and the second contact;
    wherein the shape memory alloy is in thermal communication with the vehicle compartment such that transmitting mechanical energy from the moving animate object to the shape memory alloy and transitioning the shape memory alloy from one of a cold state and a hot state to the other of the cold state and the hot state in response to a temperature within the vehicle compartment deforms the shape memory alloy and changes the distance between the first contact and the second contact sufficiently to change the electrical connection between the first and second contacts from one of open to closed, and closed to open, thereby causing the first sensor to generate the electrical charge or current, said first sensor being operatively connected to the controller such that the controller receives a signal when the first sensor generates the electrical charge or current; and
    wherein the controller is configured to:
        determine whether the temperature inside the vehicle compartment is above a first predetermined temperature;
        determine whether the temperature inside the vehicle compartment is below a second predetermined temperature; and
        generate a command signal when the controller determines that at least one predetermined condition exists, said at least one predetermined condition including receiving the signal from the first sensor, and determining that the temperature of the passenger compartment is one of above the first predetermined temperature and below the second predetermined temperature.

2. The system of claim 1, further comprising a wireless transmitter operatively connected to the first sensor and configured to transmit a radio frequency signal to the controller in response to the electrical charge or current of the first sensor.

3. The system of claim 1, further comprising a telematics transmitter; and wherein the controller is operatively connected to the telematics transmitter to transmit the command signal thereto.

4. The system of claim 1, wherein the first sensor includes piezoelectric material.

5. The system of claim 4, wherein the piezoelectric material is a piezopolymer.

6. The system of claim 4, wherein the piezoelectric material is a piezoceramic.

7. The system of claim 1, wherein the command signal is at least one of a signal to unlock a vehicle door, activate a window regulator, activate an air conditioning system, sound an alarm, activate an audio system, activate a vehicle light, open a decklid, and open a liftgate.

8. The system of claim 1, wherein the first sensor is connected to an energy storage unit which is configured to store energy generated by one of deformation and dislocation of the first sensor.

9. The system of claim 8, wherein the energy storage unit is operatively connected to a radio frequency transmitter to transmit energy thereto to power the transmission of a radio frequency signal from the radio frequency transmitter.

10. The system of claim 9, wherein the power to transmit the radio frequency signal is provided by the first sensor and the energy storage unit independent of other vehicle power sources.

11. The system of claim 1, further comprising:
a second sensor defining an electrical circuit including a shape memory polymer, a third contact and a fourth contact;
wherein the shape memory polymer is fixedly connected to the third and fourth contacts and is configured to selectively change a distance between the third and fourth contacts;
the second sensor being mounted with respect to the vehicle body to receive mechanical energy from the moving animate object inside the vehicle compartment and transmit the mechanical energy to the shape memory polymer; and being configured to generate an electrical charge or current by converting the mechanical energy to electrical energy when an electrical connection between the third and fourth contacts is changed from one of:
open to closed; and
closed to open;
by changing the distance between the third contact and the fourth contact;
wherein shape memory polymer is in thermal communication with the vehicle compartment such that transmitting mechanical energy from the moving animate object to the shape memory polymer and transitioning the shape memory polymer above a glass transition temperature in response to a temperature within the vehicle compartment deforms the shape memory polymer to change the distance between the third contact and the fourth contact and to change the electrical connection between third and fourth contacts from one of open to closed, and closed to open, thereby causing the second sensor to generate the electrical charge or current, said second sensor being operatively connected to the controller such that the controller receives a signal when the second sensor generates the electrical charge or current; and
wherein the controller is configured to generate a command signal when the controller determines that at least one predetermined condition exists, said at least one predetermined condition including receiving the signal from one of the first sensor and the second sensor, and determining that the temperature of the passenger compartment is one of above the first predetermined temperature and below the second predetermined temperature.

12. The system of claim 1, further comprising:
a rigid member configured to receive energy from the moving animate object inside the vehicle compartment and transmit the mechanical energy to the shape memory alloy.

13. A system for detecting an object inside a vehicle passenger compartment comprising:
a vehicle body defining the passenger compartment at a compartment temperature;
a seat inside the passenger compartment;
an active material member characterized by a first modulus below a predetermined temperature and a second modulus above the predetermined temperature, wherein the active material member is in thermal communication with the passenger compartment;
an electrical circuit including the active material member and an alert system selectively activated by the active material member;
wherein the seat is operatively connected to the active material member by a rigid member interposed between the seat and the active material and configured to transmit at least part of the weight of an animate object on the seat to the active material member; and
wherein the active material member is configured to activate the alert system by deforming in response to the weight transmitted by the rigid member to the active material from the seat and transitioning from one of the first and second modulus to the other of the first and second modulus in response to the compartment temperature.

14. The system of claim 13, wherein the circuit further includes:
a first contact;
a second contact mounted with respect to the active material;
wherein the active material is a shape memory alloy and configured such that the first and second contacts are moved apart from one another and the electrical circuit is opened to activate the alert system when the active material is deformed by the weight and above the predetermined temperature; and
wherein the active material is configured such that the first and second contacts are in contact with one another and the alert system is deactivated when the active material is subjected to the weight below the predetermined temperature.

15. The system of claim 13, wherein the circuit further includes:
a first contact connected to the active material member;
a second contact connected to the active material member;
wherein the active material is a shape memory polymer and configured such that the first and second contacts are apart from one another and the electrical circuit is open and the alert system is deactivated when the active material is deformed by the weight and below the predetermined temperature; and
wherein the active material is configured such that the first and second contacts are moved in contact with one another to activate the alert system when the active material is deformed by the weight and above the predetermined temperature.

16. The system of claim 15, wherein the active material member is configured as a c-shaped hinge.

17. The system of claim 8, wherein the active material is a shape memory alloy; wherein the shape memory alloy forms a portion of the circuit; and wherein the circuit further includes a fuse member configured to fracture when the shape memory alloy is deformed by the weight and above the predetermined temperature, thereby opening the electrical circuit.

18. The system of claim 13, wherein the active material is connected to an energy storage unit which is configured to store energy generated by one of deformation and dislocation of the active material.

19. The system of claim 18, wherein the energy storage unit is operatively connected to a radio frequency transmitter to transmit energy thereto to power the transmission of a radio frequency signal from the radio frequency transmitter.

* * * * *